United States Patent

[11] 3,582,784

[72] Inventor Wilmer B. Gaunt, Jr. Boxford, Mass.
[21] Appl. No. 768,813
[22] Filed Oct. 18, 1968
[45] Patented June 1, 1971
[73] Assignee Bell Telephone Laboratories, Incorporated Murray Hill, N.J.

[54] DELTA MODULATION SYSTEM
2 Claims, 6 Drawing Figs.

[52] U.S. Cl. .......... 325/38, 332/11, 329/104
[51] Int. Cl. .......... H04b 1/66
[50] Field of Search .......... 179/15 APC; 325/38.1

[56] References Cited

UNITED STATES PATENTS 3,109,987 11/1963 Linder .......... 325/38.1
3,249,870 5/1966 Greefkes .......... 179/15APC

*Primary Examiner*—Robert L. Griffin
*Assistant Examiner*—Anthony H. Handal
*Attorneys*—R. J. Guenther and James Warren Falk

ABSTRACT: A delta modulation system is disclosed in which the input signal is compared with a reference level derived from the integrated output signal, the comparison resultant modulating a pulse train to produce the delta output signal in the conventional manner. The magnitude of the signal applied to the integrator is determined by the slope of the integrator output by applying the integral to a feedback loop including a differentiating circuit, the resultant derivative being gated to the integrator by the delta output signal.

INVENTOR
W. B. GAUNT, JR.
BY R. C. Winter
ATTORNEY

DELTA MODULATION SYSTEM

BACKGROUND OF THE INVENTION

This invention relates to pulse transmission systems and more particularly to improvements in such systems which employ delta modulation.

Among the many arrangements available for representing analog signals in digital form, delta modulation has the advantage of permitting the employment of the simplest coding and decoding circuitry. Generally speaking this practice requires quantization of changes in signal levels; i.e., the representation by one of two discrete values or quantum levels of the difference between a signal sample, which may have any amplitude in a continuous range, and a reference level determined by the previously transmitted signal sample.

In one simple form of delta modulation, the transmitted pulses are applied to identical integrating circuits at the transmitter and at the receiver. The integrator output at the transmitter provides a reference level which is compared with the original signal or input message wave at a rate which is determined by the sampling frequency. If the instantaneous amplitude of the input wave is higher than the integrator output reference level at the beginning of a sampling interval, a positive polarity output pulse is transmitted during the sampling interval. This output pulse, in turn, generates the quantum level that increases the integrator output to provide a higher reference level for the next sampling period. Contrarily, if the instantaneous amplitude of the input wave is lower than the integrator output reference level, no output pulse is transmitted, and the output reference level of the integrator decreases during the following sampling interval. The density of the resultant output pulse train thus corresponds to the slope of the input wave.

In a delta modulation system, amplitude quantization gives rise to deviations of the signal voltage reproduced at the receiver from the initial signal voltage supplied to the transmitter. Such deviations are referred to as quantization noise and can be controlled by employing a high sampling frequency and a small amplitude quantum. If the amplitude quantum is a fixed value, this noise factor may become intolerable at low signal levels unless the amplitude quantum is also very small. However, overcoming small signal problems simply by employing a small fixed amplitude quantum may prevent the faithful tracking of the waveform throughout its dynamic range. This problem could be overcome only by an inordinate increase in the sampling frequency, i.e., an increase in the transmission bandwidth.

SUMMARY OF THE INVENTION

In accordance with my invention these problems are solved by the employment of a surprisingly simple arrangement which permits meticulous construction and accurate reproduction of the transmitted signals as well as an appreciable reduction in quantization noise without requiring an increase in the sampling frequency. The transmitter comprises the conventional comparator and sampler, with the sampler output generating quantum levels which are integrated and applied to the comparator for comparison with the input message wave.

My invention adds a feedback loop to the integrator, the loop serving to differentiate the audio portion of the integrator output and to permit the absolute value of the resultant derivative to establish the magnitude of the quantum level applied to the integrator. In this fashion the size of the quantum level applied to the integrator is forced to vary as a function of the slope of the integrator output, which in turn is related to the incremental change in amplitude of the input wave. Thus a steep slope in the input wave will produce large quantum levels, while little or no slope in the input wave will produce proportionately smaller quantum levels and thus proportionately less quantizing noise. In brief the integrated quantum level, which is compared with the input wave in each sampling interval, now will vary as the input wave varies.

DRAWING

Figure 1:
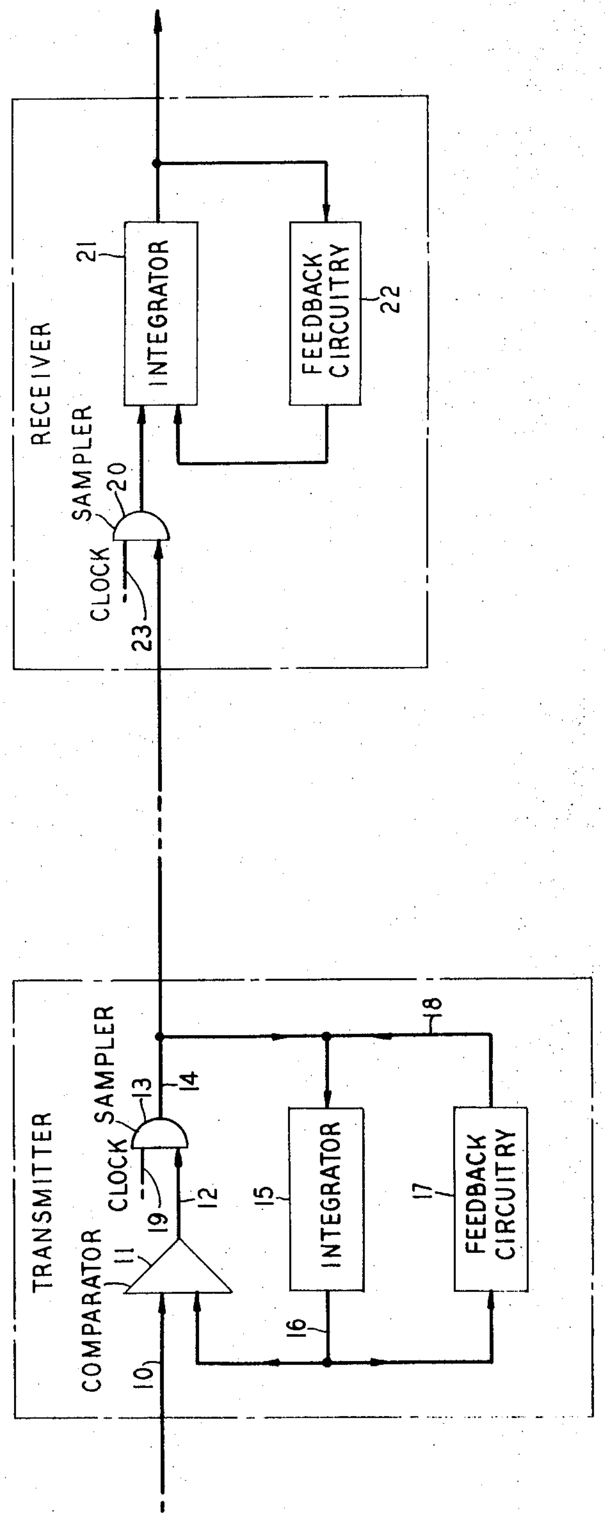
FIG. 1 is a block diagram of the transmitter and receiver of a delta modulation system in accordance with one illustrative embodiment of this invention.

In FIG. 1 there is shown a block diagram of an illustrative embodiment of the invention which effectuates the form of differential quantization of a signal known as delta modulation. The input signal on lead 10 at the transmitting station is first applied to a comparator or difference circuit 11 where it is compared with the output of the integrator 15. The output of comparator 11 on lead 12 is applied to a sampler or pulse modulator 13 which provides a binary "1" pulse if the difference signal is positive and a binary "0" pulse if the difference signal is negative each time a clock pulse is received on lead 19. The "quantized" signal on lead 14 then is transmitted to integrator 15, the output of which is applied via lead 16 to comparator 11.

This basic operation of a delta modulation transmitter, as known in the prior art and shown, for example, in F. K. Bowers U.S. Pat. No. 2,817,061 issued Dec. 17, 1957, results in a delta modulated output signal from the sampler 13, as can readily be seen by referring to the waveforms in FIG. 2. For purposes of illustration consider a signal wave 26, having successive amplitudes at the respective sampling rate indicated at the bottom of FIG. 2. Whenever the voltage in sawtooth pattern 27, representing the output of integrator 15, is less than the voltage in curve 26 at the instant a clock pulse is applied to sampler 13, e.g., at point *a* in FIG. 2, a binary "1" pulse will be transmitted from sampler 13. This pulse is transmitted via conductor 14 to the associated receiver and is also applied to the input of integrator 15, so that the voltage at the output of integrator 15 will be increased by a predetermined amount to point *b*, FIG. 2.

During the balance of the sampling interval, the voltage stored in integrator 15 is dissipated such that upon receipt of the next clock pulse at sampler 13, the voltage in pattern 27 will be at point *c* which again is less than the voltage in curve 26. Therefore at this instant, comparator 11 again produces a positive output signal which will modulate the clock signal to produce a binary "1" output of sampler 13. This binary "1" signal again serves to increase the quantum level in integrator 15. This time, however, the voltage in pattern 27 will sustain a level *d* exceeding the voltage in curve 26 at the outset of the next sampling interval. Under these conditions, comparator 11 will fail to provide an output signal which, in turn, serves to block the output of sampler 13, resulting in transmission of a binary "0" signal to the associated receiver and a continued decline in the integrator output to point *e*. The process continues with the integrator output voltage oscillating about the input wave, depicted by curve 26, thereby producing an approximation of the input wave which can be utilized at the receiver to reproduce the original input wave simply by duplicating the sampling and integrating operations.

In the illustrative embodiment shown in FIG. 1, the output on conductor 14 of sampler 13 is transmitted to the receiver where it is sampled in sampler 20 and passed through an integrator 21 to reproduce a replica of the original input signal. Integrator 21 advantageously may comprise the same arrangement of elements as found in transmitter integrator 15 and described hereinafter with reference to FIG. 4.

Figure 2:
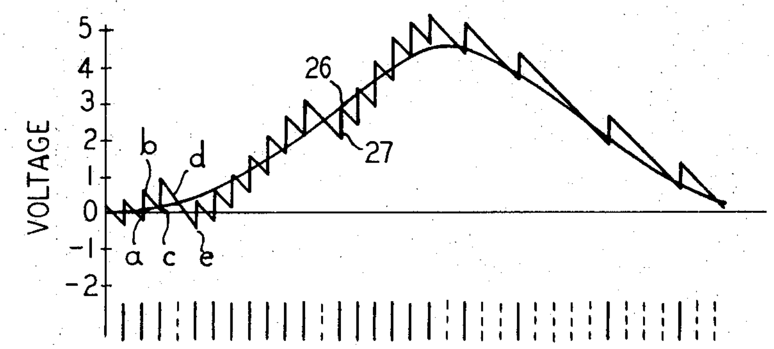
FIGS. 2, 3A and 3B are timing diagrams illustrative of the operation of the delta modulation system depicted in FIG. 1.
Figure 3A:
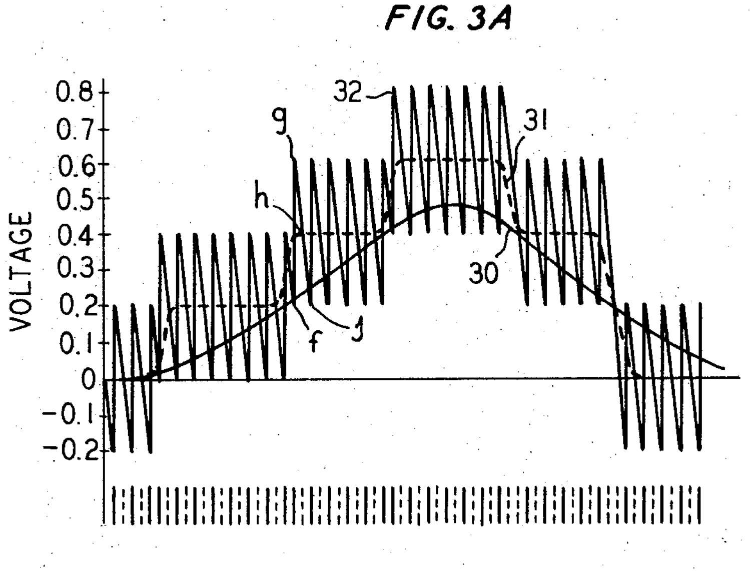

It is significant in this instance to observe that the prior art arrangement employs a fixed quantum level such that despite the slope of the input wave, the integrator output voltage will always rise by the same amount, as determined by the fixed quantum level. So long as the input wave has an appreciable amplitude, the sampling frequency, as depicted by the sampler output signals at the bottom of FIG. 2, is sufficient to provide a pattern which will permit a faithful reproduction of the original input wave. However, when the input wave is of very low amplitude, as depicted in FIG. 3A, a fixed quantum level will produce a voltage pattern at the same sampling frequency which cannot follow the original input wave with sufficient accuracy to permit a satisfactory reproduction of the input wave at the associated receiver. Thus input wave 30 in FIG. 3A differs only in amplitude from curve 26 illustrated in FIG. 2. In this instance the amplitude of the signal voltage is substantially smaller, e.g., a factor of 10 smaller than the voltage in curve 26, the voltage in curve 30 being in a 0.1 volt scale, while that in FIG. 2 is indicated in a 1 volt scale.

As a result of the amplitude quantization, the accuracy of the input wave reproduction decreases with low amplitude owing to the employment of a fixed quantum level to produce the integrator output voltage. Thus it is apparent from consideration of FIG. 3A that an accurate construction of the input voltage is not transmitted below a given threshold value. The curve 31 shown in broken lines in FIG. 3A illustrates the low frequency component of the integrated voltage pattern 32, which obviously constitutes a very coarse approximation of the input wave. Moreover, with speech voltages of low amplitude, the quantization noise is particularly disturbing since, in its absolute value, this noise is a constant which is independent of the input voltage. This indicates that the ratio between the input voltage and the quantization noise decreases toward the low amplitude input voltages.

The two effects, which are particularly disturbing with low input signal amplitude, i.e., inaccurate reproduction and a decreasing ratio of input voltage to quantization noise at lower speech amplitudes, are obviated in accordance with this embodiment of my invention. Thus as indicated in FIG. 1, a feedback loop contains circuitry 17 which differentiates the output of integrator 15 and applies the absolute value of the resultant derivate to the input of integrator 15 via lead 18. In this instance the binary output "1" or "0" of sampler 13 on lead 14 serves to gate the absolute value of the derivative received from differentiator 17 into integrator 15 where it provides the quantum level to be integrated. It is apparent, of course, that this quantum level, which is the absolute value of the integral slope, does not have a fixed value but varies instead in accordance with variations in the integrator output voltage. In this fashion small amplitude input signals on lead 10 will produce proportionately small voltage steps on lead 16. A steady state input signal over several sampling intervals will in fact produce a progressively diminishing integrator output voltage.

Figure 3B:
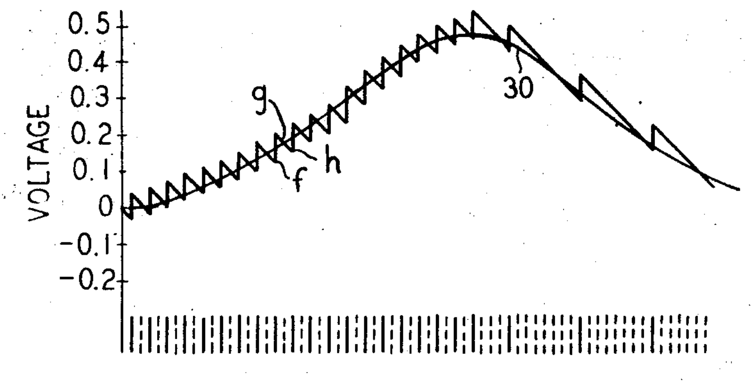

The results may be appreciated by reference to FIG. 3 in which the effect of low level input signals on the delta modulation transmitter utilizing a fixed quantum level, FIG. 3A, is compared with the effect of the same input signals on a transmitter in accordance with this embodiment of my invention, FIG. 3B. Thus as noted hereinbefore, a fixed quantum level results in the broken line output wave 31 in FIG. 3A. In this instance, the quantum spans 0.4 volts so that signal voltages within this range cannot be registered accurately. Observe, for example, the situation at point *f*, where a comparison indicates that the voltage in the integrator output pattern 32 is less than the voltage in the input wave 30. A sampler output pulse thus triggers the integrator to produce an instantaneous increase in its magnitude to point *g* from which it declines over the balance of the sampling interval so as to reside at point *h* at the outset of the next sampling interval. Since point *h* is considerably above the instantaneous amplitude of the input wave 30, the comparator will fail at this time to produce a sampler output, and the integrator output pattern will continue to show a decline during the ensuing sampling interval. Thus at point *j*, which occurs at the outset of the next succeeding sampling interval, the integrator output voltage is once again less than the voltage in the sampling wave at that time so that another complete quantum gain is realized.

This process will continue without a change in output wave 31 until the amplitude of input wave 30 increases more than 0.2 volt or one-half the quantum voltage value. It is apparent, therefore, that no change in amplitude in the input wave can be registered so long as the wave falls within the range of one-half the fixed quantum value.

The advantage in utilizing the variable quantum in accordance with the illustrative embodiment of my invention now becomes apparent. Thus referring to FIG. 3B the identical small amplitude input wave 30 is reproduced. Considering again the situation at point *f*, with the integrator output voltage less than the voltage in the input wave at that time, the comparator will permit the sampler to provide a positive output pulse which, in turn, gates the quantum level into integrator 15. Rather than a fixed quantum of 0.4 volts, as depicted in FIG. 3A, the quantum provided in this instance is the absolute value of the slope of the previous integrator output. Since this previous integrator output voltage, as noted in FIG. 3B, was approximately 0.1 volt, the absolute value of its slope will be substantially below this level.

Let us assume, therefore, that the integrator output rises from point *f* by a predetermined amount that will permit its decay to point *g* which is at or slightly above the instantaneous amplitude of the input wave at that point. Thus the comparator fails to permit the sampler to provide a positive output pulse, and the integrator output continues to decay such that, at the outset of the next sampling interval, point *h*, the integrator output voltage is once again below the input wave voltage. The integrator now receives a new quantum input which is necessarily smaller than the last quantum since it is derived from the slope of the last integrator output.

The resultant is an extremely faithful tracking of the input wave by the integrator output pattern. It is also apparent that when a steady state signal is present during a succession of sampling intervals, the feedback loop permits successive integrator output signals to decline to an almost infinitesimal value so that, in this instance, the integrator output voltage may provide an exact replica of the input wave. Also with larger input signals, the performance of this circuit arrangement corresponds to that depicted in FIG. 2 for prior art arrangements.

Figure 4:
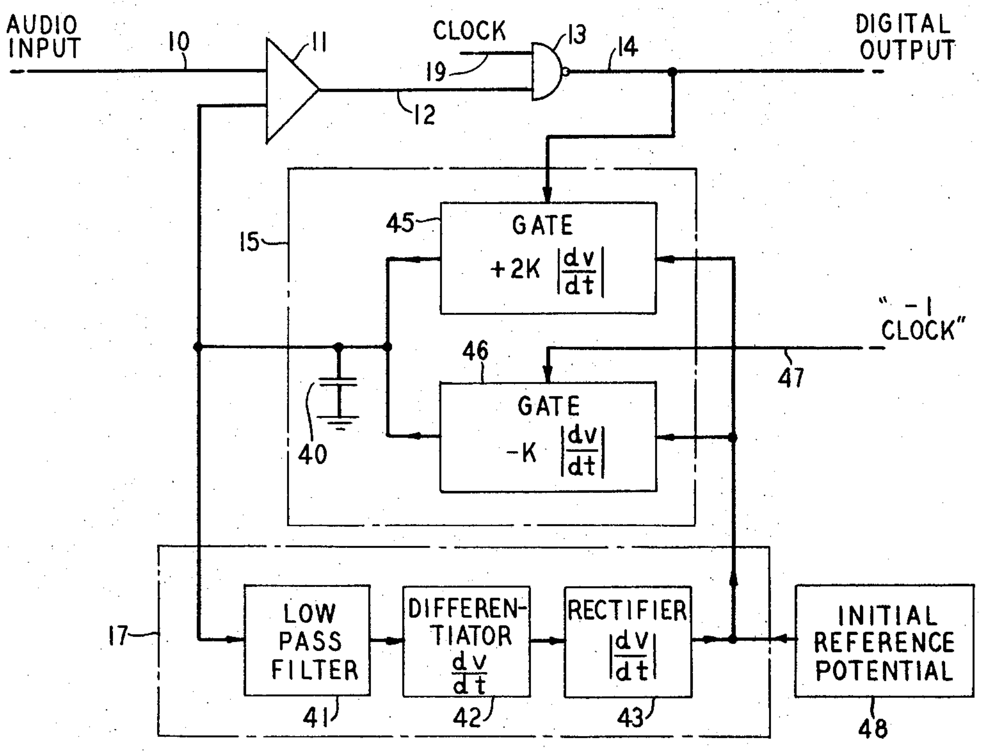
FIGS. 4 and 5 depict in greater detail the illustrative embodiment of the system depicted in FIG. 1.

A particular manner of implementing the illustrative embodiment is depicted in FIG. 4. As noted therein the integrator feedback circuitry 17 comprises a low pass filter 41 which permits passage of only the audio component of the integrator output voltage derived from capacitor 40. This audio component is then supplied to differentiator circuit 42 which, upon performing its functions, supplies the resultant derivative to a full wave rectifier 43. The latter, in turn, provides the absolute magnitude of the derivative. The output of sampler 13 on lead 14 acts as an enable signal at gate 45 in integrator 15 to pass the output of rectifier 43 to capacitor 40. The rectifier 43 output is also transmitted through a second gate 46 upon receipt of an enable signal on lead 47 from a clock pulse source synchronized with the clock pulse applied to sampler 13 which, in this instance, is depicted as a simple logic NAND gate, as known in the art.

Gate 45 in this instance comprises circuitry which doubles the value of the signal transmitted therethrough, viz., $2k|dV/dt|$, while gate 46 is connected to capacitor 40 in such a manner as to subtract the value of the rectifier 43 output therefrom, viz., $-k|dV/dt|$. Gate 46 is activated in every cycle while gate 45 is activated only when sampler 13 provides the positive output pulse. Therefore, as a digit "1" is transmitted, both gates 45 and 46 will be enabled resulting in a net gain in charge on capacitor 40 corresponding to the absolute value of the derivative of the previous integrator output, or $k|dV/dt|$. If only gate 46 is enabled, due to sampler 13 providing an output digit "0," the net loss in charge on capacitor 40 is $k|dV/dt|$.

Figure 5:
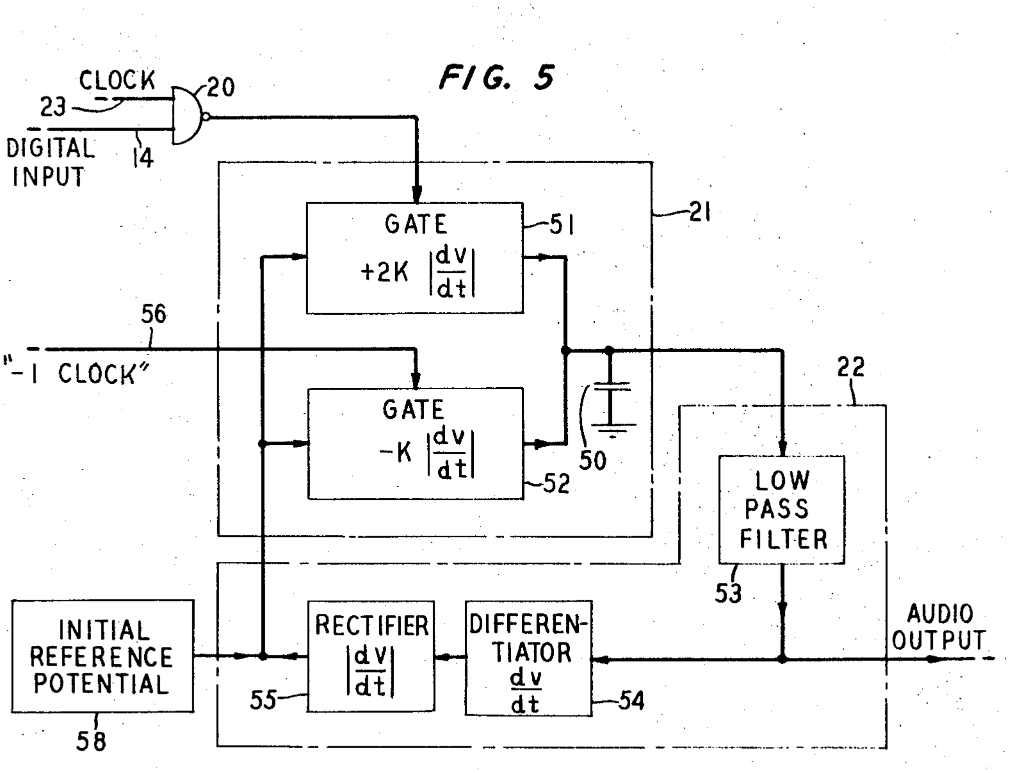

Corresponding circuitry is provided at the receiver. Thus, as depicted in FIG. 5 the delta modulated signals on lead 14 are clocked through sampler 20 by clock pulses on lead 23, and the digit "1" is used to gate $2K|dV/dt|$ to capacitor 50. At the same time gate 52 subtracts $k|dV/dt|$ from capacitor 50 upon receipt of a clock pulse on lead 56. The net result is an increase in charge on capacitor 50 of $k|dV/dt|$ upon receipt of the digit "1" and a decrease in charge of $k|dV/dt|$ upon receipt of the digit "0." The feedback circuitry 22, including low pass filter 53, differentiator 54 and rectifier 55, correspond in structure and function to their counterparts in the transmitter, the only distinction being that the reconstructed analog signal is taken from the output of filter 53.

Advantageously this arrangement also includes an initial reference potential 48, FIG. 4, and 58, FIG. 5, to assure production of a signal across capacitors 40 and 50 when circuit operation is initiated. Thus prior to the application of an input signal, the signal slope, produced across capacitor 40, would be zero. Now when the input signal is applied, gates 45 and 46 would be unable to transmit the weighted $|dv/dt|$ to capacitor 40 since $|dv/dt|=0$ at this time. Theoretically, then, the operation could not be initiated. Of course, in practice noise is always present to some degree, and this noise would have components in the audio band which would generate a finite $|dv/dt|$. Reliance on noise alone may not be sufficient, however, since the receiver is expected to track the absolute value of the transmitter integrator output. Thus the signal amplitudes may differ, since the signal across capacitor 40 is determined by the input signal at comparator 11, while no such absolute reference exists at the receiver. This is then coupled with the fact that the initial start-up $|dv/dt|$ at the transmitter would differ from that at the receiver, since distinct noise factors would be involved in their production. The reference potentials 48 and 58 establish identical minimum reference levels for $|dt/dt|$ at the transmitter and receiver, resulting in the reproduction of signals of like amplitude as well as shape.

The filtering, differentiating and rectifying operations can, in accordance with the invention, be performed by any of those means which are well known in the art for performing such functions, and this is, of course, also true of the comparator, sampler, and integrator circuits which are employed in this embodiment of the invention.

It is to be understood that the above-described arrangements are merely illustrative of the application of the principles of the invention. Numerous other arrangements may be devised by those skilled in the art without departing from the spirit and scope of the invention.

What I claim is:

1. A delta modulation system comprising comparing means supplied with an input waveform for producing a differential signal, means for modulating a timing pulse sequence with said differential signal to provide an output pulse sequence, each pulse of said output pulse sequence being produced during a timing interval in response to said differential signal being of one polarity, means for generating a first level signal upon receipt of an output pulse during said timing interval and a second level signal in the absence of an output pulse during said timing interval, integrating means connected to said generating means and said comparing means, means connected from said integrating means to said generating means comprising means for differentiating said integrating means output and means for producing a distinct signal corresponding to the absolute magnitude of said differentiating means output, said generating means comprising first gating means jointly responsive to said distinct signal and receipt of an output pulse from said modulating means for producing a positive pulse proportional to twice said distinct signal magnitude and second gating means responsive to said distinct signal for producing a negative pulse proportional to said distinct signal magnitude.

2. A delta modulation system according to claim 1 further comprising a receiver having an input terminal and an output terminal responsive to said output pulse sequence from said modulating means for producing a replica of said input waveform comprising second means responsive to said output pulse sequence received at said input terminal for generating a third level signal upon receipt of an output pulse at said input terminal during said timing interval and for generating a fourth level signal in the absence of an output pulse at said input terminal during said timing interval, second integrating means supplied with said third and fourth level signals from said second generating means, means for coupling said integrating means output to said output terminal, second means connected between the said output terminal and said second generating means comprising second means for differentiating said second integrating means output and second means for producing another distinct signal corresponding to the absolute magnitude of said second differentiating means output, said second generating means comprising a third gate jointly responsive to said other distinct signal and an output pulse from said input terminal for producing a positive pulse proportional to twice said other distinct signal magnitude and fourth gating means responsive to said other distinct signal from said input terminal for producing a negative pulse proportional to said other distinct signal magnitude.